(12) United States Patent
Derrico et al.

(10) Patent No.: US 9,311,798 B2
(45) Date of Patent: Apr. 12, 2016

(54) LOCALIZATION METHOD AND SYSTEM USING NON-REGENERATIVE UWB RELAYS

(71) Applicants: COMMISSARIAT A L'ENERGIE ATOMIQUE ET AUX ENERGIES ALTERNATIVES, Paris (FR); CONSORZIO NAZI INTERUNIV PER LE TELECOMUNICAZIONI (CNIT), Parma (IT)

(72) Inventors: Raffaele Derrico, Grenoble (FR); Andrea Conti, Ferrara (IT); Davide Dardari, Cesena (IT); Alain Sibille, Antony (FR)

(73) Assignees: Commissariat à l'énergie et aux énergies alternatives, Paris (FR); CONSORZIO NAZI INTERUNIV PER LE TELECOMUNICAZIONI (CNIT), Parma (IT)

( * ) Notice: Subject to any disclaimer, the term of this patent is extended or adjusted under 35 U.S.C. 154(b) by 259 days.

(21) Appl. No.: 13/713,950

(22) Filed: Dec. 13, 2012

(65) Prior Publication Data

US 2013/0154836 A1 Jun. 20, 2013

(30) Foreign Application Priority Data

Dec. 15, 2011 (EP) .................................. 11352013

(51) Int. Cl.
*G08B 13/14* (2006.01)
*G08B 13/24* (2006.01)
*G01S 5/02* (2010.01)

(52) U.S. Cl.
CPC ........... *G08B 13/2462* (2013.01); *G01S 5/0273* (2013.01); *G01S 5/0289* (2013.01)

(58) Field of Classification Search
CPC ...................................................... G06K 7/0008
USPC ........... 340/539.11, 572.1; 370/246; 375/138; 455/11.1
See application file for complete search history.

(56) References Cited

U.S. PATENT DOCUMENTS 6,081,232 A * 6/2000 Pittman et al. ................ 342/368
7,868,760 B2 * 1/2011 Smith et al. ................ 340/572.1
(Continued)

FOREIGN PATENT DOCUMENTS

EP            1 617 601 A2     1/2006
WO       WO 01/46711 A1       6/2001
WO     WO 2010/151829 A2     12/2010

OTHER PUBLICATIONS

Lucca Reggiani, Roberto Morichetti; Hybrid Active and Passive Localization for Small Targets; Sep. 15, 2010.*
European Search Report issued Jul. 4, 2012, in Application No. EP 11 35 2013.

(Continued)

*Primary Examiner* — Benjamin C Lee
*Assistant Examiner* — Israel Daramola
(74) *Attorney, Agent, or Firm* — Oblon, McClelland, Maier & Neustadt, L.L.P (57) ABSTRACT

The present invention relates to a method and a system for determining the position of an object which can be a passive or an active tag (140). The system comprises a plurality of anchor nodes (111,112) and a plurality of non-regenerative relays (121,122,123) of known positions. In case of an active tag, a UWB pulse signal is emitted by the tag and received by the anchor nodes either directly or via a relay. In case of a passive tag, UWB pulse signals are sent by the anchors nodes and reflected back, either way being either a LOS path or a relayed path. A processing node (130) collects the signals received by the anchor nodes (111,112) to estimate the position of the tag.

16 Claims, 6 Drawing Sheets

(56) References Cited

U.S. PATENT DOCUMENTS

| | | | |
|---|---|---|---|
| 2003/0036374 A1 | 2/2003 | English et al. | |
| 2005/0014464 A1* | 1/2005 | Larsson | 455/11.1 |
| 2006/0022800 A1* | 2/2006 | Krishna et al. | 340/10.2 |
| 2007/0206664 A1* | 9/2007 | Grant | 375/148 |
| 2009/0085738 A1* | 4/2009 | Darianian et al. | 340/539.11 |
| 2010/0201573 A1 | 8/2010 | Lamming | |
| 2011/0274141 A1* | 11/2011 | Jantunen et al. | 375/138 |
| 2011/0305144 A1* | 12/2011 | Sethakaset et al. | 370/246 |

OTHER PUBLICATIONS

A. Bendjaballah, et at. "Multihop Wireless Communications with non regenerative relays", Proceedings of the 9$^{th}$ European Conference on Wireless Technology, XP031005272, Sep. 1, 2006, pp. 189-192.

Davide Dardari, et al., "Ranging With Ultrawide Bandwidth Signals in Multipath Environments", Proceedings of the IEEE, vol. 97, No. 2, Feb. 2000, pp. 404-426.

* cited by examiner

LOCALIZATION METHOD AND SYSTEM USING NON-REGENERATIVE UWB RELAYS

TECHNICAL FIELD

The present application relates in general to the field of radio locating systems, in particular real-time locating systems (RLTS). It also relates to the field of IR-UWB (Impulse Radio Ultra Wide Band) communications.

PRIOR ART

A real time locating system (RTLS) usually involves an infrastructure comprising a plurality of fixed nodes in known positions, also called anchors or anchor nodes, and at least an object, generally provided with a tag affixed thereon or embedded therein, the position of which has to be determined. The anchors interact with the tag and determine its position by sending and/or receiving wireless signals and measuring certain characteristics thereof.

Generally, tags can be classified into active tags, i.e. comprising an autonomously powered wireless transmitter, and passive tags, which merely reflect or backscatter the signals they receive.

Common methods to determine the position of the tags are based on time-of-arrival (TOA), time difference-of-arrival (TDOA), received signal strength (RSS) and angle-of-arrival (AOA).

Future RTLSs are expected to provide high-definition localization of objects with improved reliability and security while maintaining low power consumption and cost. High accuracy localization, even in harsh environments such as indoor and industrial scenarios, can be obtained by using ultra-wide band (UWB) signals.

By UWB signal is generally meant a signal complying with the spectral mask stipulated in the FCC regulation as of Feb. 14, 2002, and reviewed in Mar. 2005, i.e. essentially a signal in the spectral band from 3.1 to 10.6 GHz and having a −10dB bandwidth of at least 500 MHz, or a relative band larger than 0.2. In practice, two types of UWB signals are known, the multi-band OFDM (MB-OFDM) signals and the Impulse Radio UWB (IR-UWB) signals. In the following, we will consider the latter only. A UWB pulse signal consists of very short pulses, typically of the order of a few tens to hundred picoseconds, distributed within a frame.

UWB pulse signals offer the potential of achieving high ranging accuracy through signal TOA measurements due to high bandwidth and ability to resolve multipath. Further advantages of UWB signals include low power consumption at the transmitter side, robustness to multipath, low detection probability, and possibility of having high number of devices operating simultaneously with limited mutual interference.

Thanks to their low power consumption, IR-UWB transmitters have been adopted successfully for active tags, whereas passive tags have been recently proposed for next generation RFID and low-cost high-accuracy RTLSs.

The presence of obstacles in real environments gives rise to non line-of-sight (NLOS) channel conditions that may degrade ranging accuracy due to lower signal-to-noise ratio (SNR), multipath, and large delay spread. They may even render ranging impossible, thus leading to a limitation of the coverage area of the localization system.

Several NLOS mitigation approaches have been presented in the literature.

One solution to deal with severe NLOS conditions in a localization system is to increase the number of anchor nodes at the expense of higher infrastructure and deployment cost. In particular, if time-based positioning approaches (TOA) are adopted, this implies to keep the anchors tightly synchronized.

Other solutions are based on cooperative localization algorithms. However these algorithms are carried out in a distributed way among tags. The tags need therefore to be of the active type, equipped with a receiver, and hence have sufficient computational power. These solutions are hardly applicable to design cheap and energy efficient RTLSs.

Area coverage in RTLS is much more difficult and expensive than area coverage in conventional communication systems. Indeed, while it suffices to be in LOS of a base station or a relay in a communication system, at least three anchor nodes must be visible simultaneously by the tag to enable localization in two dimensions without ambiguity.

It is often desirable for cost reasons, to reduce the number of anchors regardless the presence or not of NLOS conditions. Cost and the number of anchors can be partially reduced by using low complexity relays acting as regenerative repeaters.

Extensive literature is available dealing with relays in ad hoc wireless networks or wireless sensor networks for communication reliability enhancement. However, few envisage using relays for localization purposes. For example, patent application FR-A-2924818 proposes to use regenerative relays in an ad hoc network composed by a master node and secondary active nodes to locate an object (free node) without prior synchronization between the nodes. By regenerative relay, it is meant a relay, which is able to receive a signal, to demodulate and possibly decode it for retrieving data and then to re-encode, re-modulate these data to generate a new signal.

However, the cost of regenerative relays, their requirements in terms of power supply and synchronization remain major drawbacks. Furthermore, the design of regenerative relays is strictly related to the specific signal format adopted by the RTLS. In particular, this means that the same infrastructure cannot be used for locating active tags using different data formats (encoding or modulation schemes) or for locating both active tags and passive tags.

The object of the present application is therefore to propose a localization system such as an RTLS, which does not involve the drawbacks recited above, namely which achieves a broad coverage while being simple and robust.

DISCLOSURE OF THE INVENTION

The present invention is defined in the appended independent claims. Various advantageous embodiments are given in the dependent claims.

BRIEF DESCRIPTION OF THE DRAWINGS

The present invention will be better understood from the description of the following embodiments, by way of illustration and in no way limitative thereto.

DETAILED DISCLOSURE OF PARTICULAR EMBODIMENTS

We will consider in the following a localization system comprising a plurality of anchor nodes (or anchors) and one or several non-regenerative relay(s). It is assumed that the positions of the anchor nodes (per definition) and of the non-regenerative relays are known.

By non-regenerative relay it is meant a relay which merely forwards and possibly amplifies an incoming signal. In particular, a non-regenerative relay does not demodulate/decode the incoming signal to regenerate it. The non-regenerative relays can be of the active type or the passive type, as explained in detail further below.

Figure 1:
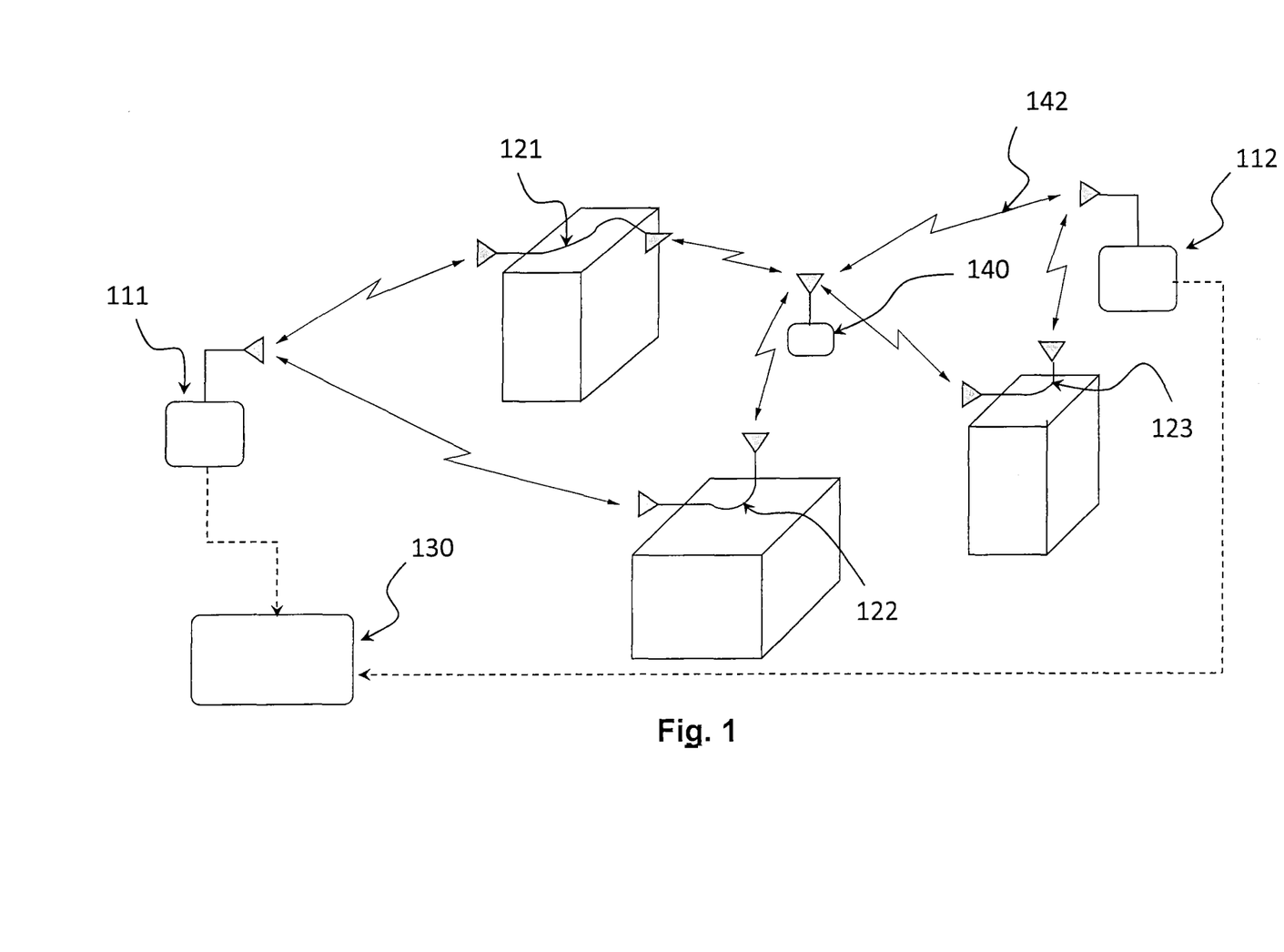
FIG. 1 schematically represents a localization system according to an embodiment of the invention.

FIG. 1 schematically represents a localization system according to an embodiment of the invention.

This system comprises a plurality $N_A$ of anchors, 111, 112, a plurality $N_R$ of non-regenerative relays 121, 122, 123, and a processing node, 130, linked to all the anchor nodes, either wirelessly or by cables 150. The processing node can be one of the anchor nodes.

The localization system is capable of locating a tag 140, according to a first localization scenario where the tag is of the active type or according to a second localization scenario when the tag is of the passive type.

It will be noted that the anchor node 111 is in NLOS condition with respect to tag 140 because of the presence of an obstacle. However, due to the presence of the non-regenerative relays 121, 122, the tag can receive or transmit a signal from and to this anchor node. The channels involving a retransmission by a relay are called relayed channels. A LOS channel can coexist with one or several relayed channels. For example, the LOS channel 142 between tag 140 and anchor node 112 coexists with relayed channel 143,143' (relayed by 123). In general, a signal transmitted by an anchor node can be relayed by one or several relays to the tag. Conversely, a signal transmitted by the tag can be relayed by one or several relays to an anchor node.

The number of anchor nodes and relays is chosen to achieve localization coverage in the zone of interest. In other words, a tag located at an arbitrary position within the zone of interest should see at least three nodes of known positions (anchor nodes or relays).

Figure 2A:
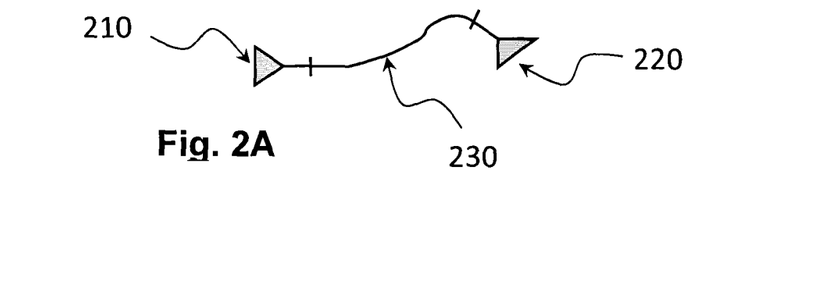
FIG. 2A represents a first type of non-regenerative relay for use in the localization system of FIG. 1.
Figure 2B:
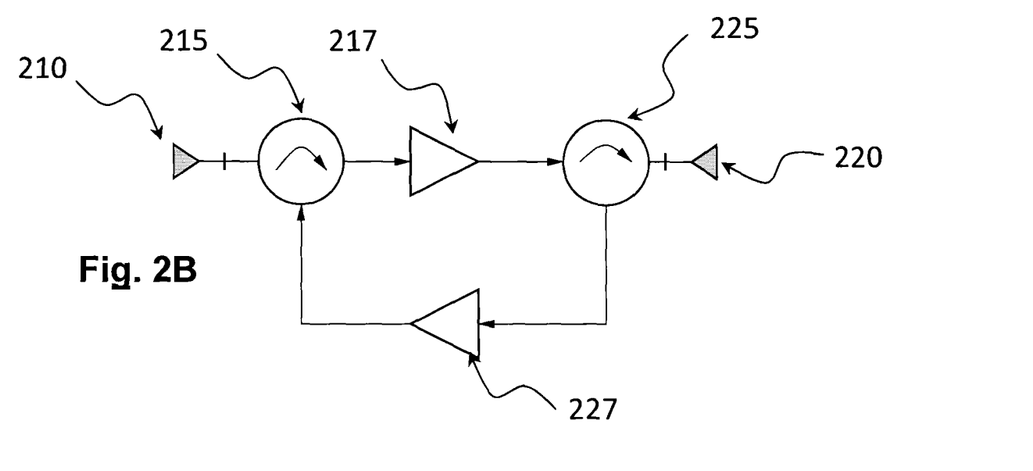
FIG. 2B represents a second type of non-regenerative relay for use in the localization system of FIG. 1.
Figure 2C:
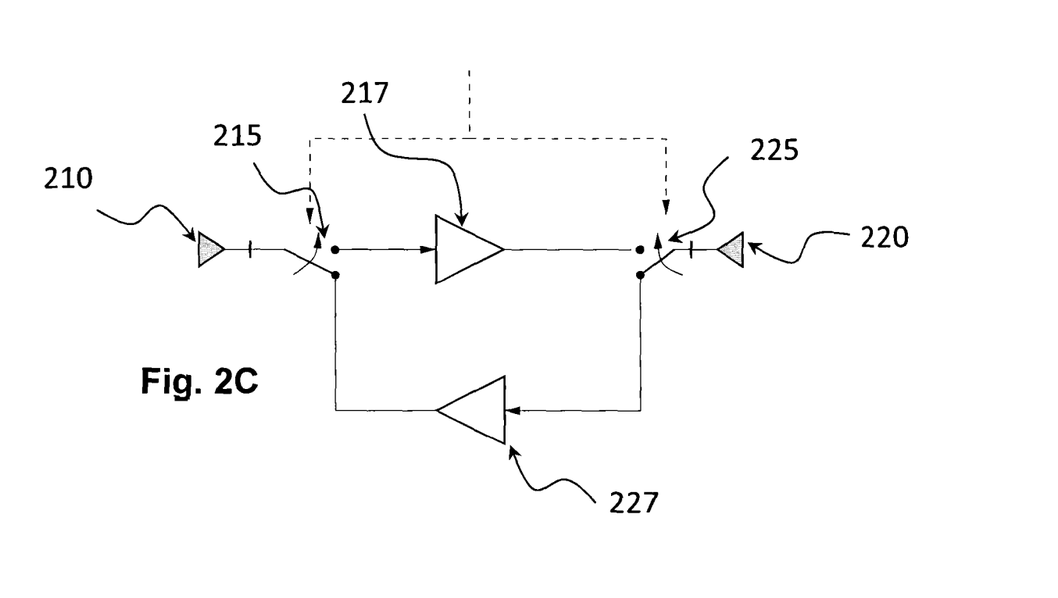
FIG. 2C represents a third type of non-regenerative relay for use in the localization system of FIG. 1.

The non-regenerative relays 121,122,123 can be of the passive type as shown in FIG. 2A or of the active type as shown in FIGS. 2B and 2C.

The passive non-regenerative relay of FIG. 2A is simply composed of a first high-gain directional UWB antenna 210 and a second directional or omnidirectional UWB antenna 220 connected with a coaxial cable 230. If the first and second antennas are both directional antennas, the first and second antennas are oriented in distinct directions. Hence, a signal received by one of the two antennas is simply forwarded by the other antenna without amplification. Such a relay is also sometimes referred to as a cold repeater or of the just-forward type.

FIG. 2B shows a first example of an active non-regenerative relay. By active, it is meant that the relay performs an amplification of the received signal. Such a relay is also often referred to as of the amplify-and-forward type.

As above, the relay illustrated in FIG. 2B comprises a first UWB antenna 210 and a second UWB antenna 220. A first duplexer, 215, (e.g. here a circulator) is connected to the first UWB antenna, 210, and a second duplexer, 225, (e.g. a circulator) is connected to the second UWB antenna, 220. A first amplifier, 217, provided between the first and the second duplexers, amplifies the signal received by the first antenna and delivers the amplified signal to the second antenna. A second amplifier, 227, provided between the second and the first duplexer, amplifies the signal received by the second antenna and delivers the amplified signal to the first antenna. A drawback of this scheme is the positive feedback that may arise between the antenna and/or the lack of insulation of the duplexers. In particular, the mutual coupling between the two antennas must be controlled. According to a variant not shown, for use in the first scenario described further below, relaying can be made unidirectional (from tag to anchors) and therefore amplifier 217 together with circulators 215,225 can be omitted.

FIG. 2C shows a second example of an active non-regenerative relay which overcomes the aforementioned limitations.

This relay has the same structure as in FIG. 2B except that the duplexers 215 and 225 are respectively replaced by one pole-double throw switches 216 and 226. These switches are controlled by an external binary synchronization signal. In a first binary state of the synchronization signal, the switches 216 and 226 respectively connect the input and the output of the first amplifier, 217, to the first and the second antenna. In a second binary state, the same switches respectively connect the input and the output of the second amplifier, 227, respectively to the second and the first antennas. Hence the amplify-and-forward path in one direction is decoupled in time from the amplify-and-forward path in the other direction.

The synchronization signal can be provided by an anchor node controlling that specific relay through an auxiliary wireless control channel, or through a cable. Alternatively, the synchronization signals of the various relays can be generated by a centralized control node.

In any case, synchronization constraints are here much more relaxed compared to that of regenerative relays. According to a variant not shown, for use in the first scenario described further below, relaying can be made unidirectional (from tag to anchors) and therefore amplifier 217 together with switches 216,226 can be omitted. In such instance the relay is further simplified as no synchronization signal is required.

Whatever their type, the relays are deployed in such a way that their first antenna 210 is in LOS condition with respect to one preferred anchor node and their second antenna 220 is in LOS condition with respect to a zone of interest intended to be covered e.g. a zone in NLOS with respect to the preferred anchor node.

Figure 3A:
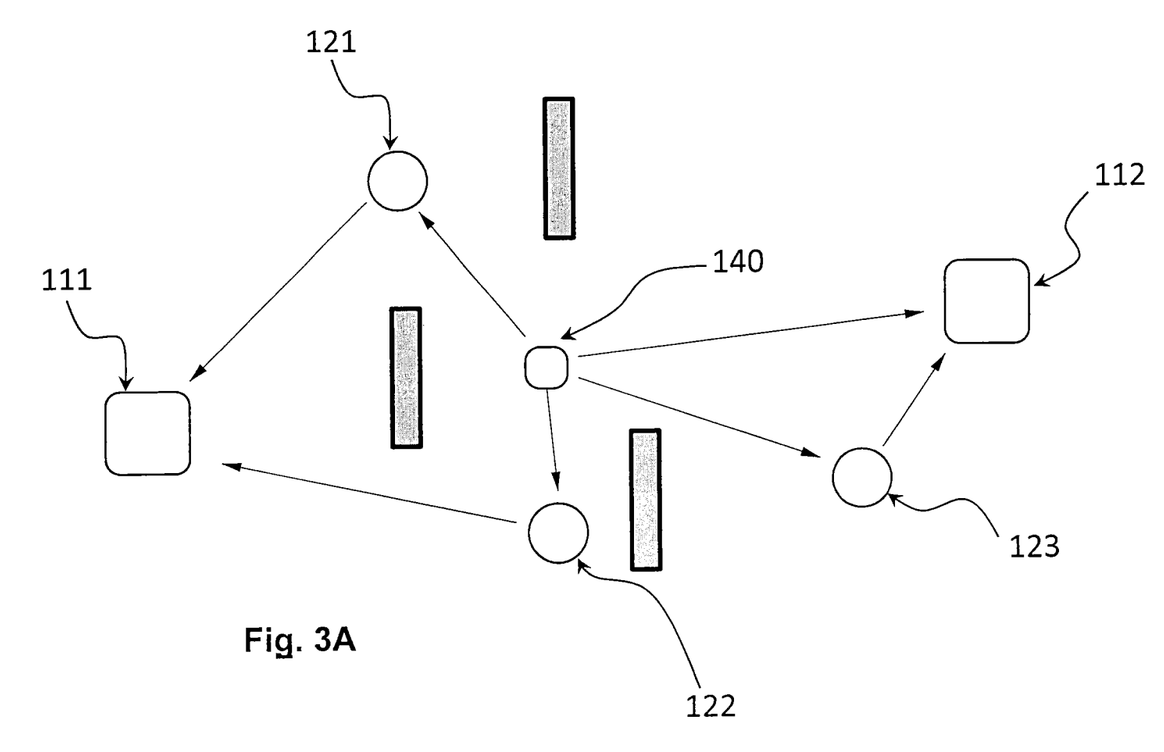
FIG. 3A represents a first scenario for locating a tag with the localization system of FIG. 1.

FIG. 3A represents a first scenario of use for the localization system of FIG. 1. The same references designate here the same elements as in FIG. 1.

In this scenario, at least one active tag, 140, is present. This tag emits a UWB pulse signal which is received by the anchor nodes and relays in LOS condition with respect thereto. In the case illustrated, the anchor node 112 and the relays 121, 122 and 123 directly receive the UWB pulse signal. Anchor node 111 receives the UWB pulse signal respectively relayed by relays 121 and 122 but does not receive it directly due to the presence of the obstacle 170.

In general the various transmission channels between the tag and the LOS anchors/relays can be multipath. The same applies to the channels between the relays and their related anchor nodes. For simplification purpose but without prejudice of generalization, it will be assumed in the following that the transmission channels are single path.

The UWB pulse signal emitted by the tag is in general a sequence of very short pulses which can be expressed as follows:

$$s(t) = \sum_{n=0}^{N_s-1} g(t - t_0 - nT_s) \quad (1)$$

where g(t) is the elementary pulse shape, $T_s$ is the duration of an elementary interval, $t_0$ is the time of emission, and $T_f=N_s T_s$ is the length of the sequence.

In some instances, each active tag may emit its own sequence modulated by a time-hopping code:

$$s_k(t) = \sum_{n=0}^{N_s-1} g(t - t_0 - nT_s - c_k(n)T_c) \quad (2)$$

with $T_s=N_c T_c$ where $N_c$ is the number of chips in an interval, and where $c_k(n)$ for $n=0, \ldots, N_s-1$ defines the time hopping code of tag k. Time hopping codes are selected so as to minimize the number of collisions between pulses belonging to time hopping codes of different tags.

Alternatively or additionally, each tag may emit a sequence modulated by a bipolar code. For example if both time-hopping and bipolar coding is used:

$$s_k(t) = \sum_{n=0}^{N_s-1} b_k(n)g(t - t_0 - nT_s - c_k(n)T_c) \quad (3)$$

where $b_k(n)$, $n=0, \ldots, N_s-1$, $b_k(n)=\pm 1$, defines the bipolar code of tag k.

For the sake of illustration, we will assume in the following that the signal sent by an active tag is monopulse ($N_s=1$). It should be clear though that the invention equally applies independently of the length of the sequence and the type of modulation used.

Figure 3B:
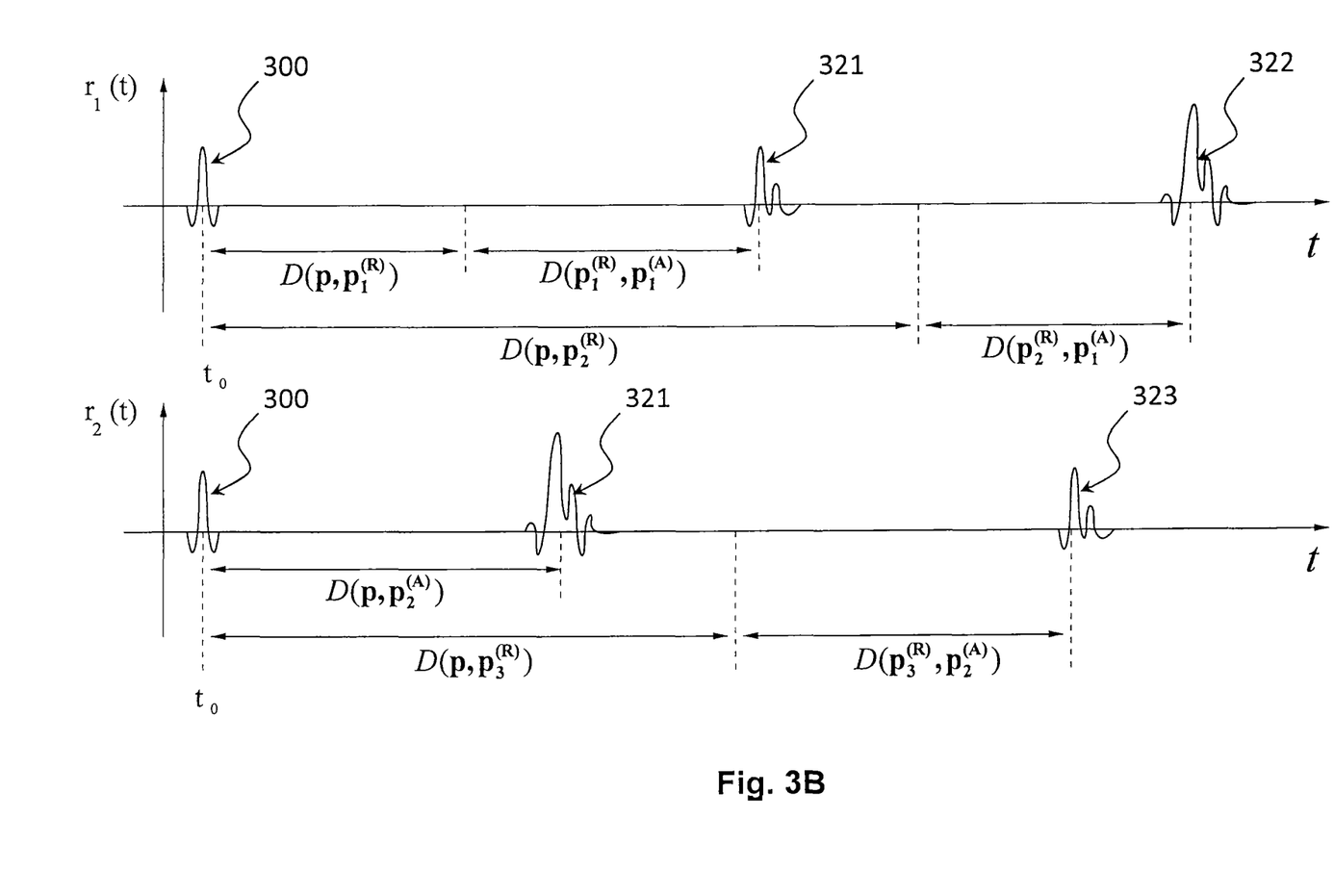
FIG. 3B represents an example of signals received by anchor nodes of the localization system in the first scenario.

FIG. 3B represents the UWB pulse signal received by various anchors of the localization system, in the present instance by anchor nodes 111 and 112.

The upper part of the figure shows the UWB pulse signal $r_1(t)$ received by anchor 111, and the lower part shows the UWB pulse signal $r_2(t)$ received by anchor 112. In both diagrams, the pulse transmitted by the tag at time $t_0$ has been represented by 300.

With regard to anchor 111, the signal $r_1(t)$ comprises a first pulse 321 which has been relayed by non-regenerative relay 121 and a second pulse 322 which has been relayed by non-regenerative relay 122. The first pulse is received after a delay $D(p,p_1^R)+D(p_1^R,p_1^A)$ where p is the position of the tag to be determined (i.e. the vector of coordinates of the tag), $p_1^R$ is the position of the relay 121 and $p_1^A$ is the position of the first anchor 111. Similarly, the second pulse is received after a delay $D(p,p_2^R)+D(p_2^R,p_1^A)$ where $p_2^R$ is the position of the relay 122.

With regard to anchor 112, the signal $r_2(t)$ comprises a first pulse 340, which has been directly received from the tag and a second pulse 322 which has been relayed by non-regenerative relay 123. The first pulse is received after a delay $D(p,p_2^A)$, where $p_2^A$ is the position of the second anchor 112. The second pulse is received after a delay $D(p,p_3^R)+D(p_3^R,p_2^A)$ where $p_3^R$ is the position of the relay 123.

More generally, each anchor will receive a LOS UWB pulse signal from the tag and/or one or a plurality of relayed versions thereof.

Assuming that the signal emitted by the tag at time $t_0$ is monopulse, the signal received by an anchor $m=1, \ldots, N_A$ can be expressed as:

$$r_m(t) = w(p, p_m^A)g(t - t_0 - D(p, p_m^A)) + \sum_{i=1}^{N_R} w(p, p_i^R)w(p_i^R, p_m^A) \quad (4)$$
$$\sqrt{G_i}\, g(t - t_0 - D(p, p_i^R) - D(p_i^R, p_m^A) - \delta^R) + n_m(t)$$

where $$D(p, q) = \frac{1}{c}\|p - q\|,$$

c being the speed of light and w(p,q) is the channel gain between nodes of positions p and q, $G_i$ is the power gain of the i-th relay, $\delta^R$ is the delay introduced by a non-regenerative relay (supposed identical for all the relays). This delay is essentially due to the propagation time through the cable and, for active relays, also through the amplifier.

The first term in (4) accounts for the LOS signal, the second term represents the contribution of the relayed signals, and the third term represents the total thermal noise with power density, $N_m$ due to the receiver as well as the relays. The LOS signal and the relayed signals are referred hereinafter to as path components of the received signal $r_m(t)$. The channel gain w(p,q) accounts for the transmitted power, antenna gains, path-loss coefficient of the LOS channel between nodes of positions p and q. In particular, if no LOS channel exists between these two nodes, the channel gain is null (w(p,q)=0). In general, the channel gain can be expressed as:

$$w(p, q) = \frac{1}{\sqrt{L(p, q)}} \quad (5)$$

where L(p,q) is the path loss coefficient of the channel between the nodes (a log-normal shadowing model can be assumed). The coefficient L(p,q) and hence the channel gain can be estimated from the environment knowledge.

The signals $r_m(t)$, $m=1, \ldots, N_A$, received by the anchors are collected by the processing node 130. The processing node comprises a processing unit which derives the position p of the tag from these signals. More specifically, the processing unit determines the coordinates of the position p and the time of emission $t_0$ from the time distribution of the pulses in the received signals $r_m(t)$. This is possible if the number of anchors and the number of relays in LOS condition of the tag is sufficiently high to remove any spatial ambiguity.

Various algorithms can be used for this purpose. One possible algorithm is based on a ML (Maximum-Likelihood) approach. In such instance, one may use the following log-ML function $l(p,t_0)$ depending upon the position p of the tag and the time of emission $t_0$:

$$l(p, t_0) = \sum_{m=1}^{N_A} \frac{2}{N_m} \int_T r_m(t) s_m(t) dt - \sum_{m=1}^{N_A} \frac{1}{N_m} \int_T s_m^2(t) dt \quad (6)$$

where T is an observation window chosen long enough to accommodate all the useful signal echoes, i.e. all the possible relayed versions of the UWB pulse signal emitted by the tag. It should be understood that the first term in (6) is a correlation term whereas as the second represents the total signal-to-noise ratio.

The log-ML function can be rewritten by expressing the received signals according to (4):

$$l(p, t_0) = \sum_{m=1}^{N_A} \left\{ \begin{array}{l} \sum_{i=1}^{N_R} w(p, p_i^R) w(p_i^R, p_m^A) \sqrt{G_i} \, q_m \\ (t_0 + D(p, p_i^R) + D(p_i^R, p_m^A) + \delta^R) + \\ w(p, p_m^A) q_m(t_0 + D(p, p_m^A)) - \frac{E_m}{N_m} \end{array} \right\} \quad (7)$$

where:

$$q_m(\tau) = \frac{2}{N_m} \int_T r_m(t) g(t - \tau) dt \quad (8)$$

and $$E_m = \int_T s_m^2(t) dt \quad (9)$$

If the UWB pulse signal is not monopulse, the pulse shape $g(t-\tau)$ has to be replaced by $$s(t) = \sum_{n=0}^{N_s-1} g(t - t_0 - nT_s)$$

or $$s(t) = \sum_{n=0}^{N_s-1} g(t - t_0 - nT_s - c(n)T_c)$$

or $$s(t) = \sum_{n=0}^{N_s-1} b(n) g(t - t_0 - nT_s - c(n)T_c)$$

depending on the case envisaged under (1), (2) and (3) respectively.

At any rate, the processing unit maximizes the log-ML function $l(p,t_0)$ over the possible values of p and $t_0$. The ML estimate of the position of the tag is then given by:

$$\hat{p} = \underset{p, t_0}{\arg\max}[l(p, t_0)] \quad (10)$$

Other algorithms can equally be employed to estimate the position of the tag from the received signals $r_m(t)$, m=1, . . . , $N_A$. For example, it is possible to determine the time of arrival of each path component of the received signal by using a non-coherent receiver such as the one described in the article of D. Dardari et al. entitled "Ranging with ultrawide bandwidth signals in multipath environment" published in Proc. of IEEE Special Issue on UWB technology & emerging applications, vol. 97, No. 2, pp. 404-426, February 2009. More specifically, each signal $r_m(t)$ can be subjected, possibly after de-hopping and/or demodulating, to energy detection within a plurality of consecutive time windows. The energy values in these windows can be compared with a threshold to determine the times of arrival of the path components within $r_m(t)$. The various path components are identified according to their respective intensities and the channel gains $w(p, p_1^R), w(p_i^R, p_m^A)$ and $w(p, p_m^A)$.

Knowing the delays D $(p_i^R, p_m^A)$ and $\delta^R$, the time of emission $t_0$ can be eliminated by calculating the time difference of arrivals (TDOA) between anchors and/or relays, i.e. values $D(p, p_i^R) D(p, p_j^R)$ or $D(p, p_m^A) - D(p, p_i^A)$. The position p can then be obtained according to a conventional TDOA algorithm. Alternatively, non-coherent ML estimators can be adopted leading to a likelihood function similar to (7) and (10), where no knowledge of the received pulse g(t) is required at the receiver.

Figure 4A:
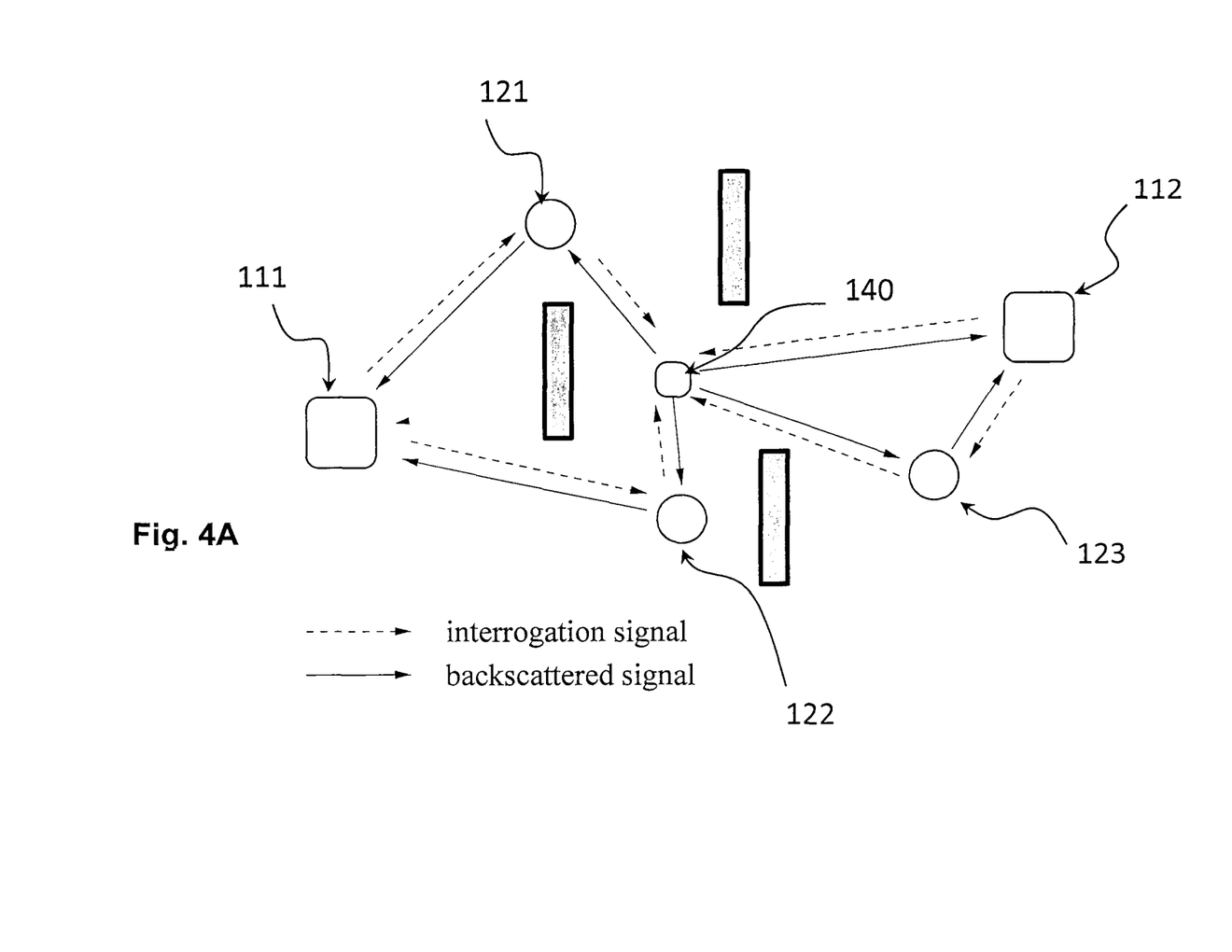
FIG. 4A represents a second scenario for locating a tag with the localization system of FIG. 1.

FIG. 4A represents a second scenario of use of the localization system of FIG. 1. Again, the same references designate here the same elements as in FIG. 1.

In this scenario, at least one passive tag 140 is present. Each anchor node emits an interrogating UWB pulse signal modulated by a unique code, e.g. a unique hopping code and/or a unique bipolar code as explained above. This signal may be repeated by one or more non-regenerative relays until it reaches the passive tag.

In the case illustrated, the interrogating UWB pulse signal emitted by anchor node 111 is relayed by relays 121 and 122 before reaching tag 140. The signal received by the tag is then reflected back toward anchor node 111 following a two-hop path through the relays nodes 121 and 122 respectively (see broken lines).

Similarly, the UWB pulse signal emitted by anchor node 112 is directly received by the tag and received after being repeated by relay 122. The signal received by the tag is then reflected back following the LOS path and the two-hop path through relay 123 (see broken lines).

Figure 4B:
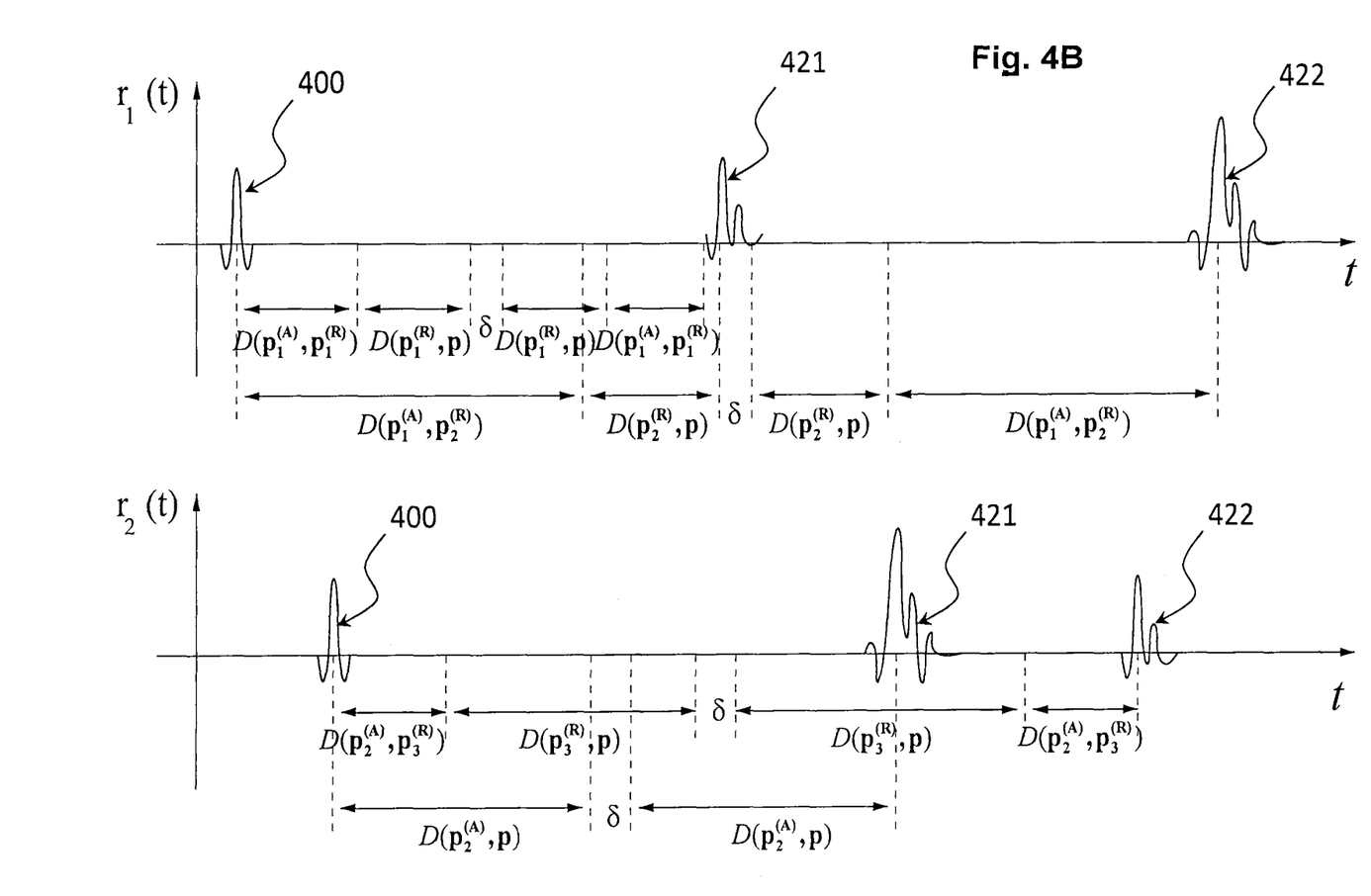
FIG. 4B represents an example of signals received by anchor nodes of the localization system in the second scenario.

FIG. 4B represents the UWB signals received by the anchor node 111 (upper part) and anchor node 112 (lower part).

For the sake of illustration, it has been assumed that the interrogating signal is constituted by a single pulse. However, in practice, it is recalled that the interrogating signal can be a sequence of short pulses modulated by a hopping code and/or a bipolar code.

The signal received by anchor node 111, $r_1(t)$, comprises a first pulse 421, which has travelled along the path $p_1^A \to p_1^R \to p$ and back, and a second pulse 422, which has travelled along the path $p_1^A \to p_2^R \to p$ and back. The signals having travelled along the paths $p_1^A \to p_1^R \to p \to p_2^R \to p_1^A$ and $p_1^A \to p_2^R \to p \to p_1^R \to p_1^A$ have not been represented for sake of clarity. The interrogating pulse 400 emitted by anchor node 111 has also been represented for showing the round trip propagation delays. With respect to the interrogating pulse, the first pulse is delayed by $2[D(p_1^A, p_1^R) + D(p_1^R, p)] + \delta^R] + \delta$ where $\delta$ is the delay introduced by the backscattering on the tag. Similarly, the second pulse is delayed by $2[D(p_1^A, p_2^R) + D(p_2^R, p) + \delta^R] + \delta$ with respect to the interrogating pulse. For the sake of simplification of illustration, $\delta^R = 0$ has been assumed on the figure.

Turning now to the lower part of the figure, the signal received by anchor node 112, $r_2(t)$, comprises a first pulse 440, which has travelled along the LOS path $p_2^A \to p$ and back, and a second pulse 423, which has travelled along the two-hop path $p_2^A \to p_3^R \to p$ and back. With respect to the interrogating pulse 400 emitted by anchor node 112, the first pulse 440 exhibits a delay $2[D(p_2^A,p)+\delta^R]+\delta$ whereas the second pulse 423 exhibits a delay $2[D(p_2^A,p_3^R)+D(p_3^R,p)+\delta^R]+\delta$. Again, $\delta^R = 0$ has been assumed on the figure.

More generally, each anchor of the localization system sends a UWB pulse signal coded with a unique code and receives the signal after reflection on the tag. The signal may have travelled along a LOS path or on a relayed path on its way to the tag or back. The signal received by the tag from an anchor node m can be expressed as:

$$s_m^{(I)}(t) = w(p_m^A, p)g(t - D(p_m^A, p)) + \sum_{i=1}^{N_R} w(p_m^A, p_i^R)w(p_i^R, p)\sqrt{G_i}\, g(t - D(p_m^A, p_i^R) - D(p_i^R, p) - \delta^R) \quad (11)$$

where the thermal noise has been neglected for the sake of simplification and by keeping the same definitions as above.

It will be understood that the first term in expression (11) accounts for the LOS path and the second for the relayed paths.

The passive tag 140 reflects or backscatters the incoming signals $s_m^{(I)}(t)$. Where several tags are present, each tag may backscatter the incoming signal according to a unique modulation code. For example, for a $i^{th}$ symbol of the modulation code equal to +1, the antenna load is a short circuit and the signal is reflected as it is whereas when this symbol is equal to −1, the antenna load is an open circuit and the signal is reflected with a polarity change.

Assuming a single tag is present, the signal received from the tag by anchor node m can be expressed as:

$$r_m(t) = w(p, p_m^A)s_m^{(I)}(t - D(p, p_m^A) - \delta) + \sum_{n=1}^{N_R} w(p, p_n^R) w(p_n^R, p_m^A)\sqrt{G_n}\, s_m^{(I)}(t - D(p, p_n^R) - D(p_n^R, p_m^A) - \delta^R - \delta) \quad (12)$$

The received signals $r_m(t)$, $m=1, \ldots, N_A$, are forwarded to the central processing node 130. The processing unit therein proceeds to the estimation of the position p of the tag from the time distribution of the pulses in the received signals $r_m(t)$.

The processing unit may adopt for example a ML or log-ML estimation method. In such instance, the log-ML function can be expressed as:

$$l(p) = \sum_{m=1}^{N_A}\left\{\sum_{n=1}^{N_R}\left[\sum_{i=1}^{N_R} l_{mni}(p)\right] + l_{mn}(p)\right\} + l_m(p) - \frac{E_m}{N_0} \quad (13)$$

where $E_m$ is defined as in (9) and:

$$l_{mni}(p) = w(p_m^A, p_i^R)w(p_i^R, p)w(p, p_n^R)w(p_n^R, p_m^A) \sqrt{G_i G_n} \cdot q_m(D(p_m^A, p_i^R) + D(p_i^R, p) + D(p, p_n^R) + D(p_n^R, p_m^A) + 2\delta^R + \delta) \quad (14)$$

accounts for the signals having travelled along a two-hop path to and from the tag, $q_m(\tau)$ being defined as in (8);

$$l_{mn}(p) = 2 \cdot w(p_m^A, p)w(p, p_n^R)w(p_n^R, p_m^A) \sqrt{G_n} \cdot q_m(D(p_m^A, p) + D(p, p_n^R) + D(p_n^R, p_m^A) + \delta^R + \delta) \quad (15)$$

accounts for the signals having travelled along a one-hop path (LOS) either to or from the tag and a two-hop path in the opposite direction and $$l_m(p) = w^2(p, p_m^A) q_m(2D(p, p_m^A) + \delta) \quad (16)$$

finally accounts for the signals having travelled along a one-hop path in both directions.

The processing unit maximizes the log-ML function l(p) over the possible values of p. The ML estimate of the position of the tag is then given by:

$$\hat{p} = \underset{p}{\mathrm{argmax}}[l(p)] \quad (17)$$

By contrast with (10), it should be noted that the maximization need not be carried out with respect to the times at which the anchors respectively transmit the UWB pulse signals, since these times are known by the processing unit.

If more than one tag is present, each tag k being associated with a unique modulating sequence $\mu_k(t)$, the expressions (13) to (17) can be calculated for each tag by replacing the correlation functions $q_m(\tau)$ by:

$$q_m^k(\tau) = \frac{2}{N_m} \int_T r_m(t) g(t - \tau) \mu_k(t - \tau) dt \quad (18)$$

Alternatively, each signal $r_m(t)$ can be subjected, possibly after de-hopping and/or demodulating, to energy detection within a plurality of consecutive time windows.

A non-coherent ML approach can be adopted in which the energy pattern is compared to that expected for each candidate tag's position and the position with the best fitting is chosen.

Alternatively, by comparing the energy values in the consecutive time windows with a threshold, it is possible to determine within $r_m(t)$ the time of arrival of the different path components (a path can be NLOS on both ways, NLOS on one way and LOS on the other or LOS on both ways). More specifically, the different path components present in $r_m(t)$ are mapped to the possible paths by taking into account the products of the channel gains along these paths. Knowing the delays $D(p_i^R, p_m^A)$, $\delta^R$, $\delta$, and the times of emission of the interrogating signals, it is possible to deduce the delays $D(p, p_i^R)$, $D(p, p_m^A)$ for those anchor nodes and/or relays which are in LOS condition with respect to the tag. The position of the tag can then be obtained by a conventional TOA or DTOA algorithm as in the first embodiment.

In the second embodiment, reference was made to a passive tag. However, it should be understood that the invention equally applies to any object or a target, in particular to a moving target. In such instance, the man skilled in the art will appreciate that the localization system according to the invention can operate as wireless sensor radar (WSR).

In the first embodiment as in the second, the invention provides a simple localization method which does not require regenerative or other sophisticated type of relays. The man skilled in the art will understand that the relays play here the role of "virtual anchor nodes", which allows to expand the coverage and to increase the precision of the localization system while keeping the localization system simple and robust.

The invention claimed is:

1. A method, implemented by a processing node, for determining the position of an active tag with a radio locating system comprising a plurality of anchor nodes in known positions, and a plurality of non-regenerative relays in known positions, each of said relays being configured to relay a UWB (ultra-wide band) pulse signal emitted by said tag to one of the anchor nodes, the method comprising:

collecting UWB pulse signals received by said anchor nodes, the UWB pulse signals being received by the anchor nodes either directly from said tag through a LOS (line of sight) path or relayed by a relay through a relayed path; and processing the thus collected signals to estimate the position of the tag together with a time of emission of originally emitted UWB pulse signal from the tag by maximizing a log maximum likelihood function over possible combinations of the position of the tag and the time of emission of originally emitted UWB pulse signal from the tag depending upon the collected signals, the maximum likelihood function taking into account a contribution of the UWB pulse signals being received by the anchor nodes directly from said tag through a LOS path and a contribution of the UWB signals being received by the anchor nodes relayed by a relay through a relayed path.

2. A method according to claim 1, wherein the non-regenerative relays are passive.

3. A method according to claim 1, wherein the non-regenerative relays are active.

4. A method according to claim 1, wherein the processing node further estimates a time of emission of the originally emitted UWB pulse signal from the tag by maximizing the log maximum likelihood function depending upon the collected signals.

5. A method according to claim 1, wherein the log maximum likelihood function is calculated as:

$$l(p, t_0) = \sum_{m=1}^{N_A} \left\{ \begin{array}{l} \sum_{i=1}^{N_R} w(p, p_i^R)w(p_i^R, p_m^A)\sqrt{G_i}\, q_m \\ (t_0 + D(p, p_i^R) + D(p_i^R, p_m^A) + \delta^R) + \\ w(p, p_m^A)q_m(t_0 + D(p, p_m^A)) - \dfrac{E_m}{N_m} \end{array} \right\}$$

where $N_A$ and $N_R$ are respectively the number of anchor nodes and the number of relays, $p_m^A$ and $p_i^R$ respectively the positions of the anchors and the relays, $\delta^R$ the delay introduced by a relay, $w(p, p_i^R)$ a channel gain between the tag and a relay i, $w(p, p_m^A)$ a channel gain between the tag and an anchor node m, $w(p_i^R, p_m^A)$ a channel gain between a relay i and an anchor node m, $D(p, p_m^A)$ a propagation delay between the tag and anchor node m, $D(p, p_i^R)$ is a propagation delay between the tag and relay i, $D(p_i^R, p_m^A)$ is a propagation delay between relay i and anchor node m, $G_i$ is the power gain of relay i, $$\dfrac{E_m}{N_m}$$

is the signal to noise ratio at anchor node m, $q_m(.)$ is a correlation between the received signal and the UWB pulse signal emitted by the tag, $t_0$ the time of emission of the UWB pulse signal, and p the position of the tag to be estimated.

6. A method according to claim 1, wherein the UWB pulse signal is modulated with a time-hopping code and/or a bipolar code.

7. A method, implemented by a processing node, for determining the position of a passive tag with a radio locating system comprising a plurality of anchor nodes of known positions, and a plurality of non-regenerative relays of known positions, each of said relays being configured to relay an interrogating UWB (ultra-wide band) pulse signal emitted from an anchor node to said passive tag and a UWB pulse signal reflected by said passive tag back to said anchor node, the method comprising:

collecting the UWB pulse signals received by said anchor nodes after reflection on said passive tag, the UWB pulse signals being received by the anchor nodes either through a LOS (line of sight) path or relayed by a relay through a relayed path; and processing the thus collected signals to estimate the position of the passive tag by maximizing a log maximum likelihood function over possible combinations of the position of the passive tag and the time of emission of originally emitted UWB pulse signal from the passive tag depending upon the collected signals, the maximum likelihood function taking into account a contribution of the UWB pulse signals being received by the anchor nodes directly from said passive tag through a LOS path and a contribution of the UWB signals being received by the anchor nodes relayed by a relay through a relayed path.

8. A method according to claim 7, wherein the passive tag is adapted to backscatter an incoming signal according to code of binary symbols, a first binary state corresponding to a reflection of the incoming signal as it is and a second binary state corresponding to a reflection of the incoming signal with a reverse polarity.

9. A method according to claim 7, wherein the non-regenerative relays are passive.

10. A method according to claim 7, wherein the non-regenerative relays are active.

11. A method according to claim 7, wherein the log maximum likelihood function is calculated as:

$$l(p) = \sum_{m=1}^{N_A} \left\{ \sum_{n=1}^{N_R} \left[ \sum_{i=1}^{N_R} l_{mni}(p) \right] + l_{mn}(p) \right\} + l_m(p) - \dfrac{E_m}{N_0}$$

with $$l_{mni}(p) = w(p_m^A, p_i^R)w(p_i^R, p)w(p, p_n^R)w(p_n^R, p_m^A)\sqrt{G_i G_n} \cdot$$
$$q_m(D(p_m^A, p_i^R) + D(p_i^R, p) + D(p, p_n^R) + D(p_n^R, p_m^A) + 2\delta^R + \delta)$$

$$l_{mn}(p) = 2 \cdot w(p, p_m^A)w(p, p_n^R)w(p_n^R, p_m^A)$$
$$\sqrt{G_n} \cdot q_m(D(p_m^A, p) + D(p, p_n^R) + D(p_n^R, p_m^A) + \delta^R + \delta)$$

$$l_m(p) = w^2(p, p_m^A)q_m(2D(p, p_m^A) + \delta)$$

where $N_A$ and $N_R$ are respectively the number of anchor nodes and the number of relays; $p_m^A$ the position of anchor node m, $p_i^R$ the position of relay i, $p_n^R$ the position of relay n; $\delta^R$ the delay introduced by a relay; $w(p, p_m^A)$ is a channel gain between the passive tag and an anchor node m, $w(p_i^R, p)$ (resp. $w(p, p_n^R)$ a channel gain between the passive tag, a relay i, resp. n, and an anchor node m, $w(p_n^R, p_m^A)$ resp. $w(p_m^A, p_i^R)$ a channel gain between an anchor node m and relay n, resp. i; $D(x,y)$ is the propagation delay between positions x and y ; $G_i$ is the power gain of relay i, $$\dfrac{E_m}{N_m}$$

gain of relay i, is the signal to noise ratio at anchor node m, $q_{;m}(.)$ is a correlation between the signal received and the UWB pulse signal emitted by anchor node m, and p the position of the passive tag to be estimated.

12. A method according to claim 7, wherein each anchor node emits a UWB pulse signal which is modulated according to a unique time-hopping and/or bipolar code.

13. A radio locating system for estimating the position of an active tag, said radio locating system comprising:
a plurality of anchor nodes of known positions;
a plurality of non-regenerative relays of known positions, each of said relays being adapted to relay a UWB (ultra-wide band) pulse signal emitted by said tag to an anchor node;
a processing node configured to collect UWB pulse signals received by said anchor nodes, the UWB pulse signals being received by the anchor nodes either directly from said tag through a LOS (line of sight) path or relayed by a relay through a relayed path, and process the thus collected signals to estimate the position of the tag by maximizing a log maximum likelihood function over possible combinations of the position of the tag and the time of emission of originally emitted UWB pulse signal from the tag depending upon the collected signals, the maximum likelihood function taking into account a contribution of the UWB pulse signals being received by the anchor nodes directly from said tag through a LOS path and a contribution of the UWB signals being received by the anchor nodes relayed by a relay through a relayed path.

14. A radio locating system for estimating the position of an active tag, said radio locating system comprising:
a plurality of anchor nodes of known positions, each anchor node being configured to emit an interrogating UWB pulse signal;
a plurality of non-regenerative relays of known positions, each of said relays being adapted to relay an interrogating UWB (ultra-wide band) pulse signal emitted from an anchor node to said active tag and a UWB pulse signal reflected by said active tag back to said anchor node;
a processing node configured to collect the signals received by said anchor nodes after reflection on said active tag, either through a LOS (line of sight) path or relayed by a relay through a relayed path, and process the thus collected signals to estimate the position of the active tag by maximizing a log maximum likelihood function over possible combinations of the position of the active tag and the time of emission of originally emitted UWB pulse signal from the active tag depending upon the collected signals, the maximum likelihood function taking into account a contribution of the UWB pulse signals being received by the anchor nodes directly from said tag through a LOS path and a contribution of the UWB signals being received by the anchor nodes relayed by a relay through a relayed path.

15. A radio locating system according to claim 13, wherein each non-regenerative relay comprises a first antenna and a second antenna, a first switch connected to said first antenna and being adapted to switch between the input of a first amplifier and the output of a second amplifier, a second switch connected to said second antenna and being adapted to switch between the input of the second amplifier and the output of the first amplifier, the first switch and second switch being either simultaneously switched to the respective input and output of the first amplifier, or simultaneously switched to the respective output and input of the second amplifier.

16. A method according to claim 1, wherein the maximum likelihood function is calculated based on a channel gain and a propagation delay between the tag and each relay in the system, a channel gain and a propagation delay between the tag and each anchor node in the system, and a channel gain and a propagation delay between each relay and each anchor node in the system.

* * * * *

UNITED STATES PATENT AND TRADEMARK OFFICE
CERTIFICATE OF CORRECTION

PATENT NO. : 9,311,798 B2  
APPLICATION NO. : 13/713950  
DATED : April 12, 2016  
INVENTOR(S) : Raffaele Derrico et al.

Page 1 of 1

It is certified that error appears in the above-identified patent and that said Letters Patent is hereby corrected as shown below:

On the title page, Item (73), the Assignees' Information is incorrect. Item (73) should read:

--(73) Assignees: Commissariat à l'énergie atomique et aux énergies alternatives, Paris (FR); CONSORZIO NAZI INTERUNIV PER LE TELECOMUNICAZIONI (CNIT), Parma (IT)--

Signed and Sealed this  
Fifth Day of July, 2016

Michelle K. Lee  
*Director of the United States Patent and Trademark Office*